Patented Oct. 4, 1949

2,483,576

UNITED STATES PATENT OFFICE 2,483,576

MALEIC ACID LIQUOR PURIFICATION AND ISOMERIZATION TO FUMARIC ACID

Géza E. Neuman de Végvár, New York, N. Y., assignor to Allied Chemical & Dye Corporation, New York, N. Y., a corporation of New York No Drawing. Application November 1, 1947, Serial No. 783,625

7 Claims. (Cl. 260—537)

This invention relates to a new and improved method for the purification of maleic acid and more particularly refers to a method for inactivating impurities in maleic acid liquors obtained by water absorption of reaction products resulting from the catalytic oxidation of benzene and other organic compounds.

U. S. application, Serial No. 775,955, entitled "Production of fumaric acid," filed September 24, 1947, by Sidney M. Spatz, discloses that the group of compounds represented by the general formula

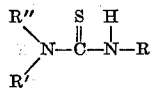

wherein R, R' and R'' are radicals of the group consisting of hydrogen, hydrocarbon, and acyl of the type R'''CO, in which R''' is a hydrocarbon radical, the sum of carbon atoms in the radicals R, R' and R'' not exceeding 8 are excellent isomerizing agents for inverting maleic to fumaric acid. Examples of such inversion agents are: thiourea, N,N'-diethylthiourea, N-allylthiourea, N,N'-di-n-butylthiourea, N-acetyl-thiourea and N-phenylthiourea.

Maleic acid liquors obtained by scrubbing out maleic anhydride with water from the gases produced by catalytically oxidizing hydrocarbon vapors such as benzene vapor, contain organic impurities which include quinones and aldehydes. I have found that when a compound of the general formula

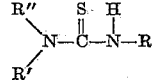

as defined above, for example, thiourea, is added to such an aqueous maleic acid liquor to effect conversion of the maleic acid therein to fumaric acid, a substantial portion of the thiourea is consumed or inactivated by the impurities and performs no effective work in converting the maleic acid. The exact nature of the impurities in the crude maleic acid liquor and the mechanism of the action by which they interfere with the use of thiourea and related inversion agents to effect the conversion of the maleic acid to fumaric acid are not known.

Since the loss of such relatively costly inversion agents contributes a considerable proportion of the cost of fumaric acid made from the aforesaid impure maleic acid liquors, a primary object of this invention is to destroy or inactivate the impurities less costly means than such inversion agents.

I have made the surprising discovery that urea, which is ineffective to invert maleic acid to fumaric acid or to react with thiourea and related inversion agents, readily acts upon the impurities in the crude maleic acid liquor to render them incapable of interfering with the inversion action of thiourea and related inversion agents upon the maleic acid. Thus, a crude maleic liquor first may be treated with an amount of urea sufficient to inactivate the impurities, and thereafter the liquor can be treated only with that amount of thiourea compound which is required to effect the conversion of maleic acid to fumaric acid. Thus, by pretreating the crude maleic acid liquor with urea, which is much less expensive than thiourea and related inversion agents, to prevent the impurities in the liquor from inactivating any of the inversion agents used, a substantial saving may be secured.

The purification pretreatment with urea may be carried out in any suitable manner. In one method of applying the invention and aqueous solution of maleic acid in which maleic acid may be also in suspension, and obtained as main or by-product in the catalytic air oxidation of organic compounds, is maintained at atmospheric temperature in an appropriate vessel, and to the maleic acid solution is added a small quantity of urea. The mixture is then agitated for several hours. To this latter mixture sufficient thiourea is added to effect the conversion of maleic acid to fumaric acid and the mixture is agitated for approximately 24 hours. The fumaric acid which precipitates is separated by filtration and the filter-cake is washed and dried.

The amount of urea required for the purification depends on the nature and concentration of the impurities present in the maleic acid liquor. The optimum amount may be determined by reacting small samples of the maleic acid liquor to be purified with various amounts of urea, and thereafter reacting each sample with a standard amount of thiourea, e. g. 2.5 grams of thiourea per 100 grams of maleic acid to effect the conversion of maleic acid to fumaric acid. A complete removal of impurities interfering with thiourea is indicated when the yield of fumaric acid obtained from the pretreated maleic acid liquor with a standard amount of thiourea is essentially equal to that similarly obtained with a solution of like concentration prepared from pure maleic acid.

In the pretreating of maleic acid liquors, I prefer to use an amount of urea not to exceed 2.5% based on the weight of maleic acid treated since additional amounts of urea secure substantially no improvement in yield of fumaric acid, and excessive amounts, e. g. above 5%, tend to discolor the fumaric acid product as illustrated in Example 2 below when highly impure maleic acid liquors are employed.

The purifying action of urea is rapid even at room temperature, although elevated temperatures may be employed to accelerate the action. The invention may be carried out in connection with maleic acid liquors of from 5% to 75% (by weight) concentration at temperatures of from 20° C. to the boiling points of the liquors under atmospheric pressures. Preferably concentrations of from 20% to 40% and temperatures of about 20° C. to about 30° C. are employed. Ordinarily treatment of the maleic acid liquor with urea for about 2 hours at room temperature is sufficient to inactivate the impurities, although the treating period may be longer if desired.

The invention is further illustrated by the following examples:

*Example 1.*—1 gram of urea was added to 100 cc. of aqueous maleic acid liquor, which contained 44 grams of maleic acid together with small amounts of impurities of the type hereinabove referred to. The maleic acid liquor was obtained by scrubbing with water the gaseous reaction products, resulting from the catalytic oxidation of benzene vapors to maleic anhydride in the presence of a catalyst comprising vanadium oxide. The mixture of maleic acid liquor and urea was maintained at room temperature for 2 hours with occasional stirring. The 0.8 gram of thiourea was added, and the mass was held at room temperature for an additional 24 hours with occasional stirring. The insoluble fumaric acid thus formed was separated by filtration, and the filter-cake was washed with the mother liquors and dried in an oven. Approximately 90% of the theoretical yield of fumaric acid was thus obtained.

Essentially similar results were obtained when the pretreatment with urea was prolonged to 17 hours.

However, when the operation was repeated in a manner identical with the foregoing but with the omission of the pretreatment with urea, the thiourea was inactivated by the impurities present in the maleic anhydride, and no fumaric acid was observed to precipitate.

*Example 2.*—300 cc. portions of maleic acid liquor were mixed with 3, 6 and 12 grams respectively of urea. The maleic acid liquor employed was obtained in the same manner as the liquor utilized in Example 1 except that the absorption liquor containing about 40% by volume of maleic acid was concentrated by evaporation to about 70% strength, cooled to room temperature to crystallize part of their content of maleic acid, and filtered. The mother liquors, containing 57% by volume of maleic acid, were diluted with water to 40% by volume of maleic acid (i. e. 100 ccs. of liquor contained 40 grams of maleic acid) and filtered, and the filtered solution was used in the tests. The mixtures were agitated at room temperature for about 5 hours. 3 grams of thiourea were then added to each portion, which was thereupon agitated at room temperature for 20 hours. The insoluble fumaric acid formed in each case was separated as a cake by filtration and dried, and the amount of crude fumaric acid thus obtained was noted. To purify the crude fumaric acid thus formed, the latter was mixed with 11 parts of water and 1/50 part of activated charcoal. The mixture was boiled for about 30 minutes, filtered, and the filter-cake was washed with about 1 part of hot water. The combined filtrate and wash liquors were cooled to 25° C. for about 4 hours and filtered. The filter-cake of purified fumaric acid was washed with a small amount of cold water, and dried at 100° C. in an atmospheric oven, and the amount and color of purified fumaric acid thus obtained were noted.

A control run omitting the pretreatment with urea was also made.

The results obtained by the foregoing tests are tabulated in the table below:

Table

| Urea | | Thiourea | | Fumaric acid | | |
|---|---|---|---|---|---|---|
| Amount per cent [1] | Time, hours | Amount per cent [1] | Time, hours | Yield Crude, per cent [1] | Yield Purified, per cent [1] | Color Purified |
| 0 | 0 | 2.5 | 20 | 0 | 0 | |
| 2.5 | 5 | 2.5 | 20 | 90 | 75 | White. |
| 5 | 5 | 2.5 | 20 | 90 | 75 | Yellow. |
| 10 | 5 | 2.5 | 20 | 90 | 75 | Brown. |

[1] Based on the weight of initial maleic acid.

It will be understood that the details and examples hereinbefore set forth are illustrative only and the invention is to be limited only by the scope of the appended claims.

I claim:

1. In a process of converting an aqueous solution of maleic acid to fumaric acid, in which the maleic acid is obtained by catalytically oxidizing organic compounds, by treatment of the solution with an inversion agent of the general formula

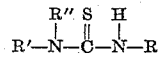

wherein R, R' and R'' represent radicals of the group consisting of hydrogen, hydrocarbon, and acyl of the type R''' CO, in which R''' is a hydrocarbon radical, the sum of the carbon atoms in radicals R, R' and R'' not exceeding 8, said maleic acid containing impurities which tend to inactivate the inversion agent, the improvement which comprises pretreating said solution by subjecting it to the action of urea for a sufficient length of time to inactivate said impurities.

2. In a process of converting an aqueous solution of maleic acid to fumaric acid, in which the maleic acid solution is obtained by hydration of maleic anhydride produced by the catalytic oxidation of benzene vapors in the presence of a catalyst comprising vanadium oxide, by treatment of the solution with an inversion agent of the general formula

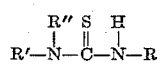

wherein R, R' and R'' represent radicals of the group consisting of hydrogen, hydrocarbon, and acyl of the type R''' CO, in which R''' is a hydrocarbon radical, the sum of the carbon atoms in radicals R, R' and R'' not exceeding 8, said maleic acid containing impurities which tend to inactivate the inversion agent, the improvement which comprises pretreating said solution by subjecting it to the action of an amount of urea not in excess of 2.5% by weight of the maleic acid for a sufficient length of time to inactivate said impurities.

3. A method of purifying an impure aqueous maleic acid solution obtained by hydration of maleic anhydride produced by the catalytic oxidation of benzene vapors in the presence of a catalyst comprising vanadium oxide which method comprises subjecting the aqueous maleic acid solution to the action of urea for a sufficient length of time to inactivate the impurities in the maleic acid solution.

4. A method of purifying a maleic acid solution obtained by hydration of maleic anhydride produced by the catalytic oxidation of benzene vapors in the presence of a catalyst comprising vanadium oxide which method comprises adding to the impure maleic acid solution an amount of urea not to exceed 2.5% by weight of the maleic acid to be treated and maintaining the mixture for a sufficient length of time to inactivate the impurities in the maleic acid solution.

5. A process for converting maleic acid to fumaric acid which comprises adding urea to an aqueous maleic acid solution obtained by scrubbing with water the gases produced by catalytically oxidizing organic compounds to maleic anhydride, maintaining the mixture of aqueous maleic acid solution and urea for a sufficient length of time to inactivate the impurities in the maleic acid solution, adding an inversion agent to effect conversion of the maleic acid to fumaric acid, said inversion agent having the general formula

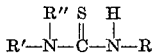

wherein R, R' and R'' represent radicals of the group consisting of hydrogen, hydrocarbon, and acyl of the type R''' CO, in which R''' is a hydrocarbon radical, the sum of the carbon atoms in radicals R, R' and R'' not exceeding 8, and separating a fumaric acid precipitate from the treated solution.

6. A process for converting maleic acid to fumaric acid which comprises adding urea in an amount not to exceed 2.5% by weight of the maleic acid to be treated to an aqueous maleic acid solution obtained by scrubbing with water the gases produced by catalytically oxidixing benzene to maleic anhydride, maintaining the mixture of aqueous maleic acid solution and urea for a sufficient length of time to inactivate the impurities in the maleic acid solution, adding thiourea to the mixture to effect conversion of the maleic acid to fumaric acid and separating a fumaric acid precipitate from the treated solution.

7. A process for converting maleic acid to fumaric acid which comprises adding urea in an amount not to exceed 2.5% by weight of the maleic acid to be treated to an aqueous maleic acid solution obtained by scrubbing with water the gases produced by catalytically oxidizing benzene to maleic anhydride, maintaining the mixture of aqueous maleic acid solution and urea at a temperature between about 20° C. and about 30° C. for a sufficient length of time to inactivate the impurities in the maleic acid solution, adding thiourea to the mixture to effect conversion of the maleic acid to fumaric acid and separating a fumaric acid precipitate from the treated solution.

GÉZA E. NEUMAN DE VÉGVÁR.

REFERENCES CITED

The following references are of record in the file of this patent:

UNITED STATES PATENTS

| Number | Name | Date |
|---|---|---|
| 2,404,103 | Scott | July 16, 1946 |
| 2,454,387 | Howland et al. | Nov. 23, 1948 |

OTHER REFERENCES

Clemo et al., J. Chem. Soc. (London), part I (1930), pp. 213–215.

Taube, J. Am. Chem. Soc., vol. 65, p. 526 (1943).

Certificate of Correction

October 4, 1949

Patent No. 2,483,576

GEZA E. NEUMAN DE VEGVAR

It is hereby certified that errors appear in the printed specification of the above numbered patent requiring correction as follows:

Column 1, line 54, before the word "less" insert *by*; column 2, line 8, before "liquor" insert *acid*; line 22, for "and" read *an*; column 3, line 34, for "The" read *Then*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*